United States Patent

Garcia

Patent Number: 5,778,860
Date of Patent: Jul. 14, 1998

[54] FUEL VAPORIZATION SYSTEM

[76] Inventor: Miguel A. Garcia, Marcial Ordonez #774, Los Mochis, Sinaloa, Mexico, 81280

[21] Appl. No.: 786,464

[22] Filed: Jan. 21, 1997

[51] Int. Cl.⁶ .................................................. F02M 31/00
[52] U.S. Cl. ................................................ 123/557
[58] Field of Search ............................ 123/557, 545, 123/546, 547, 549

[56] References Cited

U.S. PATENT DOCUMENTS

| | | |
|---|---|---|
| 4,367,717 | 1/1983 | Ray .................................. 123/557 |
| 4,424,789 | 1/1984 | Spalding ........................... 123/557 |
| 4,667,643 | 5/1987 | Arnold .............................. 123/557 |
| 4,862,858 | 9/1989 | Goldsberry ....................... 123/557 |
| 5,040,518 | 8/1991 | Hamm . |
| 5,048,501 | 9/1991 | Smith . |
| 5,097,813 | 3/1992 | Reiser . |
| 5,118,451 | 6/1992 | Lambert . |
| 5,119,794 | 6/1992 | Kushida . |
| 5,156,135 | 10/1992 | Snyder . |
| 5,205,250 | 4/1993 | Easterly . |
| 5,218,944 | 6/1993 | Leonard . |
| 5,219,399 | 6/1993 | Brana . |
| 5,231,968 | 8/1993 | Siefkes . |
| 5,257,609 | 11/1993 | Reed et al. . |
| 5,291,870 | 3/1994 | Covey . |
| 5,368,003 | 11/1994 | Clemente . |
| 5,379,728 | 1/1995 | Cooke . |
| 5,386,813 | 2/1995 | LeBlanc . |
| 5,443,053 | 8/1995 | Johnson . |
| 5,483,943 | 1/1996 | Peters . |
| 5,515,814 | 5/1996 | Cooke . |
| 5,540,198 | 7/1996 | Hurner . |

*Primary Examiner*—Marguerite McMahon
*Attorney, Agent, or Firm*—Sanford Astor

[57] ABSTRACT

A system for partially vaporizing the fuel to a vehicle internal combustion engine comprising a set of fittings for passing the fuel from the fuel pump or injection pump through a vaporization chamber which is placed adjacent the engine to heat the fuel, partially vaporizing it. Another set of fittings carries the partially vaporized fuel to the carburetor or injectors where it is mixed with air and carried in the usual manner to the combustion system. No special heating system is required as the fuel is heated simply by the vaporization chamber being in close proximity to the engine heat.

13 Claims, 2 Drawing Sheets

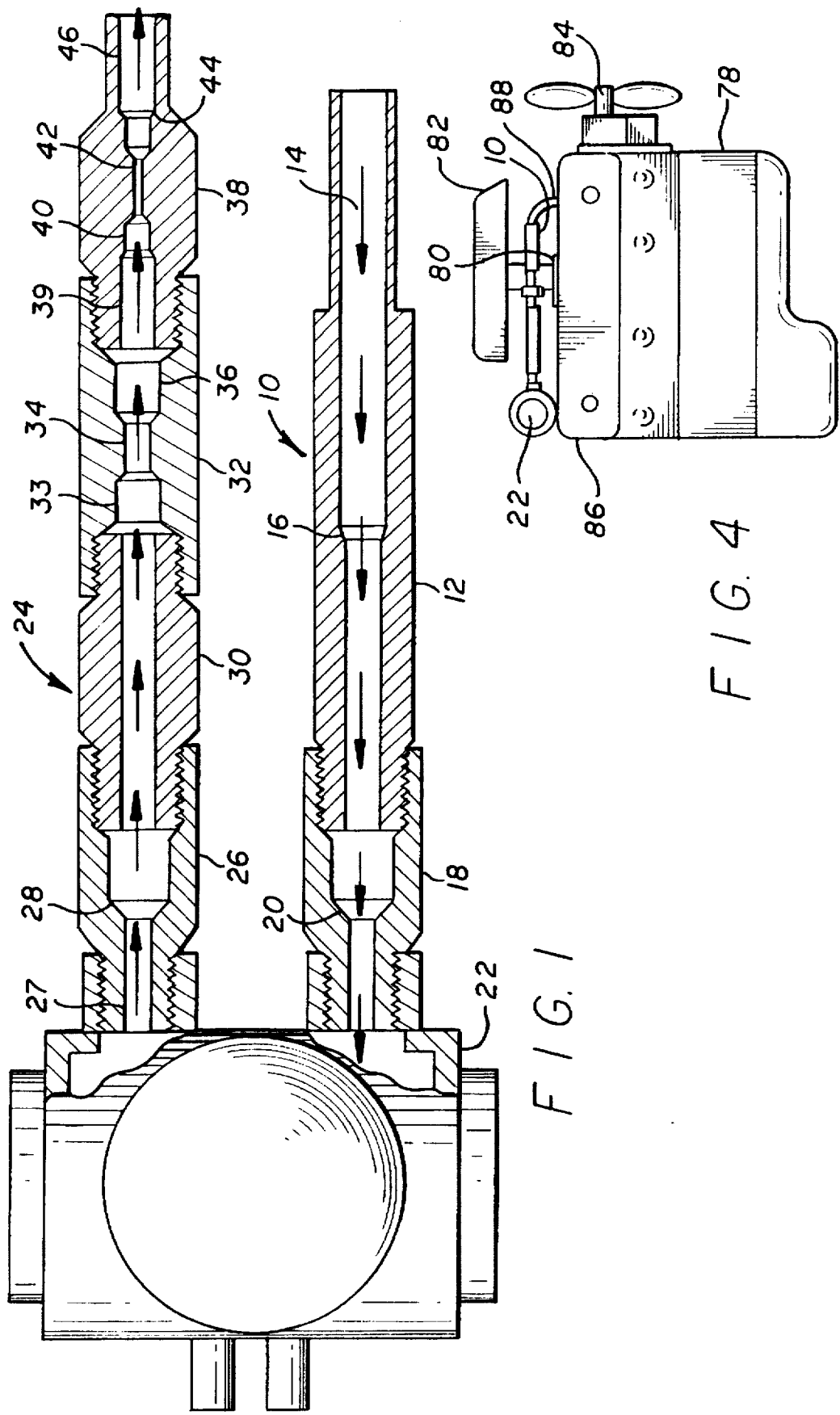

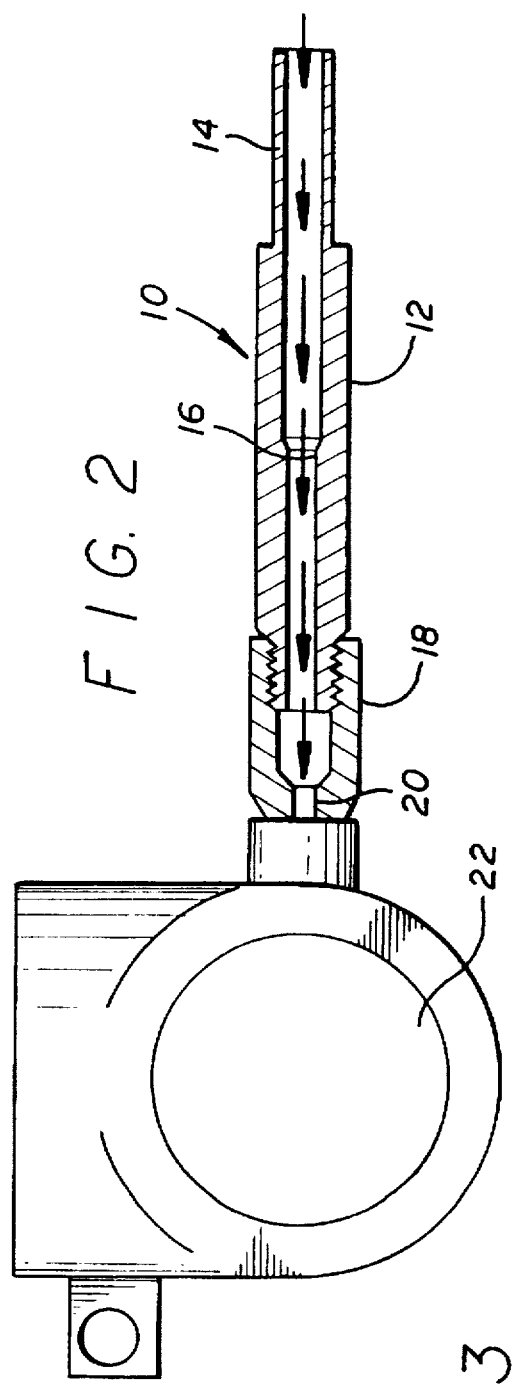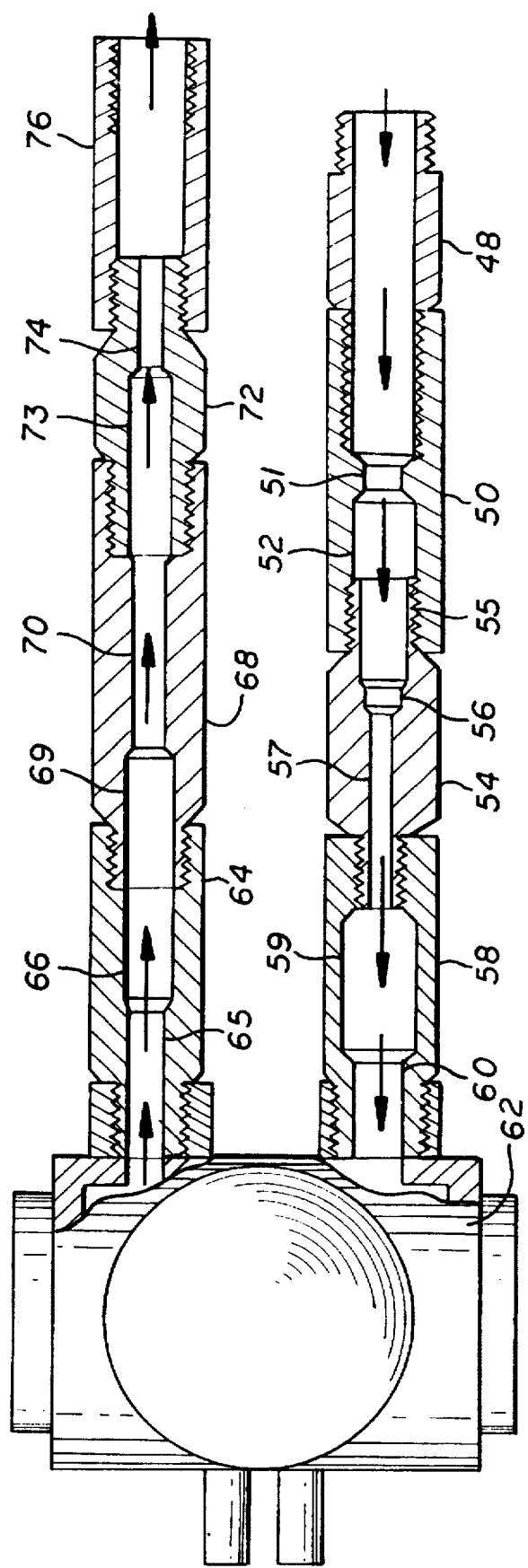

FUEL VAPORIZATION SYSTEM

BACKGROUND OF THE INVENTION

Various devices have been developed to improve internal combustion and reduce emissions in internal combustion engines. These devices include those that operate by physically changing the form of the fuel from liquid to vaporized fuel. Studies have shown that fuel in the form of gas has been found to be more efficient and cleaner burning than liquid fuel.

The systems that have been suggested for heating and vaporizing the fuel are all very complicated utilizing electrical heaters, connections to the engine's hot liquid coolant, or an attachment to the vehicle exhaust system to provide the heat to vaporize the fuel.

Examples of these complex systems are shown in U.S. Pat. Nos. 5,291,870 (using exhaust gasses), 5,205,250 (using heated engine coolant), 5,368,003 (using the vehicle's heating and cooling system) and 5,231,968 (using electically heated plugs).

OBJECTS OF THE INVENTION

Accordingly, several objects and advantages of the invention are as follows:

To provide a simple system for heating and vaporizing a portion of the fuel before it is passed into the combustion system.

To provide a system for pre-heating and vaporizing a portion of the fuel utilizing the heat from the vehicle engine without any direct connection to any source of heat from the vehicle.

Another object of the invention is to provide a method for pre-heating and vaporizing a portion of the fuel which can easily be added to any existing vehicle since it does not have to be directly connected to any other vehicle heat source.

The anti-smog and fuel economy system of this invention has been developed for the purpose of economizing fuel consumption and reducing emissions in any internal combustion engine that runs on any type of fuel. This is accomplished by partially vaporizing the fuel, approximately 25% to 35% is vaporized. It is known that fuel is at its most combustible point when when it is in a gaseous or vaporized state. It is also known that vaporizing the fuel will result in a cleaner, more complete burn which will add more power to an internal combustion engine, whether gasoline or diesel.

BRIEF DESCRIPTION OF THE DRAWINGS

FIG. 1 is a top view of the system of the present invention;

FIG. 2 is a side view thereof;

FIG. 3 is a top view of the system for a diesel engine;

FIG. 4 shows the system mounted on a vehicle engine.

DETAILED DESCRIPTION OF THE INVENTION

The vaporization process of the present invention is accomplished in three stages as shown by referring to the drawings, where FIGS. 1 and 2 show the system of the present invention adapted for a gasoline vehicle engine. Stage one comprises the intake side 10 consisting of a first fitting 12 which regulates the amount of fuel that the engine requires to work properly. The intake side is inserted into the fuel line after the fuel pump and fuel filter.

First fitting 12 is approximately 5 inches in length and has a port opening (inside diameter) 14 of approximately $5/16$ inch. The inside diameter reduces to about $1/4$ inch 16 at about the third inch of length of first fitting 12 to pressurize the fuel forward.

The next or second fitting 18 is a resting or expansion chamber about $7/16$ inch in diameter for about $1/2$ inch. Second fitting 18 then closes down to about $3/16$ inch in diameter 20 for about 1 inch in length to pressurize and push the fuel forward into the vaporization chamber 22.

Stage two is when the fuel enters the vaporization chamber 22. The vaporization chamber 22 is placed near the heat emitted by the engine which then vaporizes a portion of the fuel. Vaporization chamber 22 is usually placed simply sitting on the top of the head of the engine, as shown in FIG. 4, and laying against it. This provides enough heat, once the engine is hot, which is only a few minutes after start-up, to vaporize approximately 25% to 35% of the fuel. The temperature of the fuel is also increased about 40%. For instance, fuel entering at about 50 degrees F. will increase to about 70 degrees F. Vaporization chamber 22 does not have to be large and has an inside volume of about 52 to 62 cubic centimeters for a gasoline engine and about 63 to 73 cubic centimeters for a diesel engine.

Stage three is where the fuel exits from vaporization chamber 22 through exit side 24 back into the fuel line leading to the carburetor of the internal combustion engine. Stage three starts at fitting 26 which starts with an inside diameter of about $3/16$ inch 27 and a length of about 1 inch. Fitting 26 then opens to about $7/16$ in diameter 28 for about $1/2$ inch to expand and relax the fuel. The next fitting 30 has a smaller diameter of about $1/4$ inch 30 for about 2 inches in length to again help pressurize the fuel.

The next fitting 32 has a diameter of about $5/16$ inch and about $1/8$ inch in length 33 which then narrows to about $3/16$ inch at diameter 34 for about $5/16$ inch. The diameter then changes again at 36 to about $5/16$ inch for about $1/8$ inch in length.

The final fitting 38 includes a first portion 39 which has an inside diameter of about $1/4$ inch for about $5/8$ inches in length and a portion 40 which is about $3/16$ inch diameter and $3/16$ inch in length.

The next section 42 of fitting 38 varies depending upon the number of cylinders and horsepower of the engine. For a four cylinder engine the inside diameter is about $1/32$ to $3/64$ inch, for a six cylinder engine about $3/64$ to $1/16$ inch diameter, and for and eight cylinder engine about $1/16$ to $5/64$ inches, depending upon the horsepower. Section 42 is about $1/8$ inch in length in each case.

In a four cylinder engine the size of section 42 changes to the larger inside diameter at about 80 horsepower, for a six cylinder engine at about 120 horsepower and for an eight cylinder engine at about 180 horsepower. This is measured by actual horsepower that the engine develops, not the stated horsepower, which may or may not be accurate.

The next to final section 44 of fitting 38 will expand to about $3/16$ inch in diameter and about $3/160$ inch in length and the final section 46 expands to about $5/16$ inch in diameter and about $5/8$ inch in length to finally expand the fuel. The partially vaporized fuel is then carried on into the carburetor via the fuel line (not shown) and then to the engine where the fuel is burned in a cleaner and more efficient manner.

There is a somewhat different design for a diesel engine, however it is still in three stages as is shown in FIG. 3. Stage one is inserted into the fuel line after the injection pump and commences at first fitting 48 which has an inside diameter of about $5/16$ inch and a length of about $2 1/2$ inches. Second fitting 50 then narrows at 51 to a diameter of about $3/16$ inch for only about 1/8 inch to pressurize the fuel. The next step 52 opens to about 5/16 inch diameter for about 1/2 inch.

The next step is fitting 54 with an initial section 55 of about 1/4 inch inside diameter and about 5/8 inch in length, then narrowing 56 to about 7/32 inch for about 1/8 inch in length.

The next section 57 pressurizes the fuel into a smaller inside diameter that varies depending upon the number of cylinders and horsepower of the engine. For a four cylinder engine the diameter is from 3/32 to 5/32 inch depending on the horsepower. For a six cylinder engine the diameter is from 1/8 to 5/32 inch and for an eight cylinder engine the diameter is from 1/8 to 3/16 inch, depending upon the horsepower. The total length of section 57 is about 15/16 inch.

In a four cylinder diesel engine the size of section 42 changes to the larger inside diameter at about 220 horsepower, for a six cylinder engine at about 280 horsepower and for an eight cylinder engine at about 375 horsepower. Again, this is measured by actual horsepower that the engine develops, not the stated horsepower, which may or may not be accurate.

The fuel then passes through fitting 58 at section 59 which is about 1/8 inch in diameter and about 7/8 inch in length. It then reduces at section 60 to about 1/4 inch diameter and about 1 and 1/8 inch in length to repressurize the fuel forward into the vaporization chamber 62.

Stage two is when the fuel enters the vaporization chamber 62. The vaporization chamber 62, again, is resting in close proximity to the engine and the engine heat vaporizes a portion of the fuel while it is in vaporization chamber 62. About 25% to 35% of the fuel is vaporized.

Stage three starts at fitting 64 which has a first section 65 inside diameter of about 1/4 inch and a length of about 1 and 1/8 inch. It expands at section 66 to about 3/8 inch in diameter and about 7/8 inch in length. The next step of stage three is fitting 68 which at section 69 is about 5/16 inch in diameter and about 15/16 inch in length. It then closes down 70 to about 1/4 inch in diameter and about 1 and 1/8 inch in length.

The next step is fitting 72 which has a diameter at section 73 of about 5/16 inch in diameter and about 1 1/4 inch in length. Fitting 72 then changes at section 74 to about 3/16 inch in diameter and about 3/4 inch in length and the final fitting 76 is an adapter that is designed specifically to connect to a diesel fuel line. Its size will vary depending upon the size of the fuel line. The partially vaporized fuel is then carried into the injectors of the engine via the fuel line (not shown) where the fuel is burned by the diesel engine in a much cleaner and more efficient manner.

The measurements related above are all approximate to plus or minus 1/16 of an inch. The series of increasing and decreasing inside diameters are necessary to prepare the fuel for the vaporization chamber and to then prepare the fuel for the engine. The system is more efficient when the series of alternating larger and smaller diameters described are utilized rather than a straight line fitting.

Referring now to FIG. 4, there is shown the engine 78 of a common vehicle, the carburetor 80, the air cleaner 82, and the fan 84. Vaporization chamber 22 simply rests on top of the head 86 of engine 78 with incoming line 10 being shown with its line 88 from the fuel pump. The heat from engine 78 is readily passed into vaporization chamber 22 simply by its being so close in proximity to engine 78.

The vaporization chamber may rest at any convenient location on or near the engine and is usually most easily placed on top of the engine cover where the incoming and outgoing fuel lines may be easily located. The system may be fastened down in any convenient manner, usually by a bracket attached to the vaporization chamber and to any convenient location where it does not interfere with access to the engine. The lines which are attached to the fuel filter or injection pump at the incoming end and before the carburetor or injectors at the outgoing end also help to hold the device in place.

The system described is effective with any type of gasoline or diesel fuel. The fittings, which are a standard type of pipe fitting can be made of any standard material such as steel, copper, aluminum or other metal.

The system of this invention was actually tested on several vehicles which resulted in better fuel milage and reduced emissions. The tests run are as follows:

1. A 1986 Ford Taurus, 6 cylinder automobile was measured for emissions at a certified vehicle inspection station both before and after insertion of the device of this invention with the following results:

| | Emission Test Results | |
|---|---|---|
| | Without Device | With Device Installed |
| 2500 RPM | | |
| HC PPM | 0017 | 0014 |
| CO % | .29 | .17 |
| Idle | | |
| HC PPM | 0036 | 0011 |
| CO % | .36 | 0.00 |

2. A 1985 Ford Pick-up truck, 6 cylinder was similarly tested with the following results:

| | Emission Test Results | |
|---|---|---|
| | Without Device | With Device Installed |
| 2500 RPM | | |
| HC PPM | 0126 | 0017 |
| CO % | .74 | .13 |
| Idle | | |
| HC PPM | 0293 | 0047 |
| CO % | .23 | .07 |

The truck, without the device, did not pass the standard vehicle inspection standards, which allow only 0150 HC PPM at idle. The truck did pass with the device installed. 3. A 1986 Ford 6 cylinder Pick-up truck, with a fuel injection engine, was installed with the device and the mileage was tested before and after installation. The truck got 18–19 miles per gallon with the device and only 10–12 miles per gallon without the device installed. 4. A 1986 Ford Van, 8 cylinder, with a fuel injection engine was also tested for mileage. The Van got 10–11 miles per gallon without the device and 17–18 miles per gallon after the device was installed.

It can thus be seen that the device of the present invention achieves greatly improved gas mileage and reduced emissions.

Having thus described the invention, I claim:

1. A system for increasing the efficiency of a vehicle engine by supplying partially vaporized fuel to the engine comprising means to supply fuel to a vaporization chamber, means to pass partially vaporized fuel from the vaporization chamber to the engine. the vaporization chamber being placed in close proximity to the engine to partially vaporize the fuel solely due to the heat given off by the engine.

2. The system of claim 1 in which the means to supply fuel to the vaporization chamber and the means to pass the fuel from the chamber comprise a plurality of fittings in series in which the inside diameter of the fittings varies along its length in order to alternatively pressurize and expand the fuel.

3. The system of claim 2 for a gasoline engine in which the fuel is supplied from the fuel pump and is passed to the carburetor.

4. The system of claim 2 for a diesel engine in which the fuel is supplied from the injection pump and is passed to the fuel injectors.

5. The system of claim 2, for a gasoline engine. in which the entering fuel is passed through a first fitting having a fixed diameter which then reduces in size, then passed through a second fitting with a first increased diameter and then a smaller diameter prior to its entry into the vaporization chamber.

6. The system of claim 2, for a gasoline engine. in which the fuel, after leaving the vaporization chamber, passes through a first fitting with a first section diameter then a second section larger diameter, a second fitting having a fixed diameter, then a third fitting with a first section of a larger diameter, a second section of smaller diameter, a third section of larger diameter, and a fourth fitting with a first section of a smaller diameter, a second section of still smaller diameter, then a third section in which the diameter varies depending upon the horsepower of the engine, then a fourth section of larger diameter and finally a fifth section of still larger diameter, before passing to the fuel line to the carburetor.

7. The system of claim 2, for a diesel engine, in which the entering fuel is passed through a first fitting having a fixed diameter, then a second fitting with a smaller diameter, which then opens to a larger diameter, then a third fitting with a smaller diameter which reduces to yet a smaller diameter section which varies in size depending upon the horsepower of the vehicle engine, then a fourth fitting with a larger diameter, then reducing to a smaller diameter prior to entry into the vaporization chamber.

8. The system of claim 4. for a diesel engine. in which the fuel, after leaving the vaporization chamber, passes through a first fitting with a first section diameter then a second section larger diameter, a second fitting having a smaller first diameter and then a yet smaller diameter second section. then a third fitting with a first section of a larger diameter, a second section of smaller diameter, and a fourth fitting to pass the fuel line to the diesel fuel line to the injectors.

9. A process for increasing the efficiency of a vehicle internal combustion engine by supplying partially vaporized fuel to the engine comprising passing the fuel from the fuel supply system through a vaporization chamber, passing the then partially vaporized fuel from the vaporization chamber to the engine. the vaporization chamber being placed in close proximity to the engine so that only the heat given off by the engine partially vaporizes the fuel.

10. The process of claim 9 for a gasoline engine in which the fuel is supplied from the fuel pump and is passed to the carburetor.

11. The process of claim 9 for a diesel engine in which the fuel is supplied from the injection pump and is passed to the fuel injectors.

12. The process of claim 9 in which the fuel is passed to the vaporization chamber and from the vaporization chamber through a plurality of fittings in series in which the inside diameter of the fittings varies along the length of the fittings.

13. (The process of claim 10) A process for increasing the efficiency of a vehicle internal combustion engine by supplying partially vaporized fuel to the engine comprising passing the fuel from the fuel supply system through a vaporization chamber, passing the then partially vaporized fuel from the vaporization chamber to the engine, in which the fuel is passed to the vaporization chamber and from the vaporization chamber through a series of fittings in which the inside diameter of the fittings varies along its length in order to alternately pressurize and expand the fuel, the vaporization chamber being placed in close proximity to the engine so that only the heat given off by the engine partially vaporizes the fuel.

* * * * *